United States Patent
Kanellopoulos et al.

(10) Patent No.: US 9,790,290 B2
(45) Date of Patent: Oct. 17, 2017

(54) GAS PHASE POLYMERIZATION PROCESS

(71) Applicant: BOREALIS AG, Vienna (AT)

(72) Inventors: Vasileios Kanellopoulos, Espoo (FI);
Apostolos Krallis, Espoo (FI);
Mohammad Al-Haj Ali, Kelsinki (FI);
Ravindra Tupe, Mumbai (IN)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/110,669

(22) PCT Filed: Feb. 27, 2015

(86) PCT No.: PCT/EP2015/054149
§ 371 (c)(1),
(2) Date: Jul. 8, 2016

(87) PCT Pub. No.: WO2015/128469
PCT Pub. Date: Sep. 3, 2015

(65) Prior Publication Data
US 2016/0355613 A1 Dec. 8, 2016

(30) Foreign Application Priority Data

Feb. 28, 2014 (EP) .................................... 14157153

(51) Int. Cl.
*C08F 2/00* (2006.01)
*C08F 210/00* (2006.01)
(Continued)

(52) U.S. Cl.
CPC . *C08F 2/34* (2013.01); *C08F 2/01* (2013.01)

(58) Field of Classification Search
CPC ............. C08F 2/34; C08F 2/01; C08F 110/02
(Continued)

(56) References Cited

U.S. PATENT DOCUMENTS

| 3,324,093 A | 6/1967 | Alleman |
| 3,405,109 A | 10/1968 | Rohlfing |

(Continued)

FOREIGN PATENT DOCUMENTS

| EP | 0 045 976 | 2/1982 |
| EP | 0 045 977 | 2/1982 |

(Continued)

OTHER PUBLICATIONS

Geldart; Gas Fluidization Technology; John Wiley & Sons; 1986.
International Search Report for International Application No. PCT/EP2015/054149 dated Jun. 5, 2015.

*Primary Examiner* — William Cheung
(74) *Attorney, Agent, or Firm* — Richard M. Klein; Fay Sharpe LLP (57) ABSTRACT

An olefin polymerization process comprising polymerizing olefins in gas phase in a fluidized bed in the presence of an olefin polymerization catalyst in a polymerization reactor having a vertical body; a generally conical downwards tapering bottom zone; a generally cylindrical middle zone having a height to diameter ratio L/D of at least 4, above and connected to said bottom zone; and a generally conical upwards tapering top zone above and connected to said middle zone wherein (i) fluidization gas is introduced to the bottom zone of the reactor from where it passes upwards through the reactor; (ii) the fluidization gas is withdrawn from the top zone of the reactor, filtered, compressed, cooled and returned into the bottom zone of the reactor; (iii) a fluidized bed is formed within the reactor where the growing polymer particles are suspended in the upwards rising gas stream; and (iv) there is no fluidization grid in the reactor; characterized in that the gas velocity is maintained in the reactor such that $N_{Br}$ is within the range of from 2.5 to 7.

16 Claims, 2 Drawing Sheets

(51) Int. Cl.
*C08F 2/34* (2006.01)
*C08F 2/01* (2006.01)

(58) Field of Classification Search
USPC .................................................. 526/64, 348
See application file for complete search history.

(56) References Cited

U.S. PATENT DOCUMENTS

| | | | |
|---|---|---|---|
| 4,107,414 | A | 8/1978 | Giannini et al. |
| 4,186,107 | A | 1/1980 | Wagner |
| 4,226,963 | A | 10/1980 | Giannini et al. |
| 4,347,160 | A | 8/1982 | Epstein et al. |
| 4,382,019 | A | 5/1983 | Greco |
| 4,435,550 | A | 3/1984 | Ueno et al. |
| 4,465,782 | A | 8/1984 | McKenzie |
| 4,472,524 | A | 9/1984 | Albizzati |
| 4,473,660 | A | 9/1984 | Alnizzati et al. |
| 4,522,930 | A | 6/1985 | Albizzati et al. |
| 4,530,912 | A | 7/1985 | Pullukat et al. |
| 4,532,313 | A | 7/1985 | Matlack |
| 4,560,671 | A | 12/1985 | Gross et al. |
| 4,581,342 | A | 4/1986 | Johnson et al. |
| 4,582,816 | A | 4/1986 | Miro |
| 4,621,952 | A | 11/1986 | Aronson |
| 4,657,882 | A | 4/1987 | Karayannis et al. |
| 5,391,654 | A | 2/1995 | Ahvenainen et al. |

FOREIGN PATENT DOCUMENTS

| | | |
|---|---|---|
| EP | 0 047 077 A | 3/1982 |
| EP | 0 188 125 A | 7/1986 |
| EP | 0 250 169 A | 12/1987 |
| EP | 0 372 239 A | 6/1990 |
| EP | 0 479 186 A | 4/1992 |
| EP | 0 579 426 A | 1/1994 |
| EP | 0 683 176 A | 11/1995 |
| EP | 0 688 794 | 12/1995 |
| EP | 0 810 235 | 12/1997 |
| EP | 0 887 380 A | 12/1998 |
| EP | 1 415 999 A | 5/2004 |
| EP | 1 538 167 | 6/2005 |
| EP | 1 600 276 A | 11/2005 |
| EP | 1 739 103 A | 1/2007 |
| EP | 1 752 462 A | 2/2007 |
| EP | 1 860 125 A | 11/2007 |
| EP | 2 330 135 A | 6/2011 |
| EP | 2 495 037 * | 9/2012 |
| EP | 2 495 038 | 9/2012 |
| GB | 1272778 A | 5/1972 |
| GB | 1580635 A | 12/1980 |
| WO | WO 92/12182 A | 7/1992 |
| WO | WO 95/12622 A | 5/1995 |
| WO | WO 95/32994 | 12/1995 |
| WO | WO 96/18662 A | 6/1996 |
| WO | WO 96/32423 A | 10/1996 |
| WO | WO 97/28170 A | 8/1997 |
| WO | WO 98/58977 A | 12/1997 |
| WO | WO 98/32776 A | 7/1998 |
| WO | WO 98/58976 A | 12/1998 |
| WO | WO 99/51646 A | 10/1999 |
| WO | WO 99/61489 A | 12/1999 |
| WO | WO 00/29452 A | 5/2000 |
| WO | WO 01/55230 A | 8/2001 |
| WO | WO 02/088194 A | 11/2002 |
| WO | WO 03/010208 A | 2/2003 |
| WO | WO 03/051514 A | 6/2003 |
| WO | WO 03/051934 A | 6/2003 |
| WO | WO 03/106510 A | 12/2003 |
| WO | WO 2004/085499 A | 10/2004 |
| WO | WO 2005/118655 A | 12/2005 |

\* cited by examiner

GAS PHASE POLYMERIZATION PROCESS

This application is a national stage application under 35 USC 371 of PCT Application No. PCT/EP2015/054149 filed Feb. 27, 2015, which claims the benefit of EP Patent Application No. 14157153.9 filed on Feb. 28, 2014, the entire disclosures of each are hereby incorporated by reference in their entirety.

FIELD OF THE INVENTION

The present invention is directed to the polymerization of olefins in a fluidized bed reactor. More specifically, the present invention is directed to the polymerization of olefins in a vertical fluidized bed reactor having no fluidization grid.

PRIOR ART AND PROBLEM TO BE SOLVED

EP-A-2495037 and EP-A-2495038 disclose a process where olefins are polymerized in a fluidized bed reactor where the reactor does not contain a gas distribution plate. The superficial gas velocity within the bed in the cylindrical part was reported to be from 0.1 to 0.3 m/s.

In spite of the processes disclosed in the prior art there still remains a need for a process for olefin polymerization which can be operated in a stable manner and for long periods without a need for shut-down.

SUMMARY OF THE INVENTION

The present invention provides an olefin polymerization process comprising polymerizing at least one olefin in gas phase in a fluidized bed in the presence of an olefin polymerization catalyst in a polymerization reactor having a vertical body; a generally conical downwards tapering bottom zone; a generally cylindrical middle zone having a height to diameter ratio L/D of at least 4, above and connected to said bottom zone; and a generally conical upwards tapering top zone above and connected to said middle zone wherein (i) fluidization gas is introduced to the bottom zone of the reactor from where it passes upwards through the reactor; (ii) the fluidization gas is withdrawn from the top zone of the reactor, filtered, cooled, compressed and returned into the bottom zone of the reactor; (iii) a fluidized bed is formed within the reactor where the growing polymer particles are suspended in the upwards rising gas stream; and (iv) there is no fluidization grid in the reactor; characterized in that the gas velocity is maintained in the reactor such that $N_{Br}$ is within the range of from 2.5 to 7 wherein $$N_{Br} = \frac{\frac{d_{90} - d_{10}}{d_{50}}}{\frac{U_s}{U_t}}$$

wherein $d_{90}$ represents the smallest equivalent particle diameter so that 90% of the particles have a smaller equivalent diameter than $d_{90}$; $d_{10}$ represents the smallest equivalent particle diameter so that 10% of the particles have a smaller equivalent diameter than $d_{10}$; $d_{50}$ represents the median equivalent particle diameter; $U_s$ is the superficial gas velocity within the middle zone; and $U_t$ is the terminal velocity of the particles within the reactor.

DETAILED DESCRIPTION

Definitions

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in $m^3/s$) divided by the cross-sectional area of the middle zone (in $m^2$) and the area occupied by the particles is thus neglected.

The olefins polymerized in the process of the present invention are typically alpha-olefins having from 2 to 10 carbon atoms. Preferably the olefins are ethylene or propylene, optionally together with one or more other alpha-olefins having from 2 to 8 carbon atoms. Especially preferably the process of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Unless specifically otherwise defined, the percentage numbers used in the text refer to percentage by weight.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 40 µm, preferably from 6 to 30 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, triisobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO 95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—$NR_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524 4,522,930 4,560,671, 4,581,342, 4,657,882, EP 45976, EP 45977 and EP1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stages

The polymerization in the fluidized bed may be preceded by prior polymerization stages, such as prepolymerization or another polymerization stage conducted in slurry or gas phase. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. No. 4,582,816, U.S. Pat. No. 3,405,109, U.S. Pat. No. 3,324,093, EP-A-479186 and U.S. Pat. No. 5,391,654. As it is well understood by the person skilled in the art, the catalyst needs to remain active after the prior polymerization stages.

Gas Phase Polymerization

In the gas phase polymerization reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

The polymerization takes place in a reactor including a bottom zone, a middle zone and a top zone. The bottom zone forms the lower part of the reactor in which the base of the fluidized bed is formed. The base of the bed forms in the bottom zone with no fluidization grid, or gas distribution plate, being present. Above the bottom zone and in direct contact with it is the middle zone. The middle zone and the upper part of the bottom zone contain the fluidized bed. Because there is no fluidization grid there is a free exchange of gas and particles between the different regions within the bottom zone and between the bottom zone and the middle zone. Finally, above the middle zone and in direct contact therewith is the top zone.

The upwards moving gas stream is established by withdrawing a fluidization gas stream from the top zone of the reactor, typically at the highest location. The gas stream withdrawn from the reactor is then compressed and cooled and re-introduced to the bottom zone of the reactor. Preferably, the gas is filtered before being passed to the compressor. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

The circulation gas line preferably comprises at least one cyclone. The cyclone has the objective of removing the entrained polymer from the circulation gas. The polymer stream recovered from the cyclone can be directed to another polymerization stage, or it may be returned into the fluidized bed reactor or it may be withdrawn as the polymer product.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidized bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidization behaviour and avoid the formation of stagnant zones. As a result, the polymer quality and stability of the process are improved. Especially, a too wide cone-angle leads to an uneven fluidization and poor distribution of the gas within the bed. While an extremely narrow angle has no detrimental effect on the fluidization behaviour it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

The fluidized bed reactor of the present invention comprises no gas distribution grid and/or plate. The even distribution of the fluidization gas within the bed is achieved by the shape of the bottom zone. The omission of the gas distribution grid reduces the number of locations where fouling and chunk formation can start. The terms gas distribution grid or gas distribution plate or fluidization grid are used synonymously to denote a metal plate or a construction within the reactor which has a purpose of distributing the fluidization gas evenly throughout the cross-sectional area of the reactor. In the reactors where a gas distribution grid is used it generally forms the base of the fluidized bed.

The middle zone of the fluidized bed reactor has a generally cylindrical shape. Preferably it will be in the form of a straight circular cylinder being denoted herein simply cylinder. From a more functional perspective, the middle zone will essentially form a domain wherein the superficial velocity of the fluidization gas is essentially constant.

The middle zone typically contains most of the fluidized bed. While the bed extends to the bottom and top zones also, its major part is within the middle zone.

The middle zone has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor.

It has been found that the gas flow needed to obtain good conditions without excess entrainment of polymer from the bed, on one hand, and reduced adhesion of polymer on the walls, on the other hand, depends on the properties of the polymer powder. For reactors with L/D of the middle zone of 4 or greater, preferably 5 or greater it has now been found that the gas velocity should be chosen such that the dimensionless number, $N_{Br}$, is within the range of from 2.5 to 7, more preferably from 2.5 to 5. The number $N_{Br}$ can be calculated by using equation (I):

$$N_{Br} = \frac{\frac{d_{90} - d_{10}}{d_{50}}}{\frac{U_s}{U_t}} \tag{I}$$

In equation (I) $d_{90}$ denotes the smallest equivalent particle diameter such that 90% of all particles within the bed have a smaller equivalent diameter than $d_{90}$; $d_{10}$ denotes the smallest equivalent particle diameter such that 10% of all particles within the bed have a smaller equivalent diameter than $d_{10}$; $d_{50}$ represents the median equivalent particle diameter of the particles within the bed; $U_s$ is the superficial gas velocity within the middle zone; and $U_t$ is the terminal velocity of the particles within the reactor. According to Geldart (Gas Fluidization Technology, John Wiley & Sons, 1986), equation 6.16, the terminal velocity in turbulent regime can be calculated from the equation (II) below:

$$U_t = \sqrt{\frac{4}{3} \cdot \frac{(\rho_p - \rho_g) \cdot g \cdot d_v}{K_N \cdot \rho_g}} \tag{II}$$

In equation (II) $\rho_p$ denotes the particle density (which is the mass of the particle divided by its hydrodynamic volume; the volume of eventual pores is included in the hydrodynamic volume, see explanations in section 6.12 of Geldart), $\rho_g$ is the density of the fluidization gas, g is the gravity acceleration constant (9.81 m/s$^2$), $d_v$ is the volume diameter of the particles (median volume diameter if the particles have different diameters), and $K_N$ is a correction factor. According to Geldart $K_N$ can be calculated from equation (III).

$$K_N = 5.31 - 4.88 \cdot \psi \qquad (III)$$

In equation (III) $\psi$ denotes the ratio of the surface area of the equivalent volume sphere to the surface area of the particle, or $(d_v/d_s)^2$, where $d_v$ is the (median) volume diameter and $d_s$ is the (median) surface diameter of the particle (see Section 2.2 of Geldart).

The $d_{90}$, $d_{10}$ and $d_{50}$ values are suitably and preferably volume diameters and the percentages 90%, 10% and 50% are based on the mass of the particles. However, as the ratio is dimensionless it is not absolutely mandatory for $d_{90}$, $d_{10}$ and $d_{50}$ to represent the volume diameter, but they may also represent another, such as surface per volume or surface, diameter as long as they all represent the same diameter.

It has now been found that the number $N_{Br}$ is a useful characteristic to describe the fluidization regime in the fluidized bed. At low values of $N_{Br}$ the bed is in transport conditions. When $N_{Br}$ increases the bed goes over to fluidized conditions, first to entrained fluidization, then bubbling fluidization and finally minimum fluidization.

For low values of $N_{Br}$ of less than 2.5 the bed is in transport conditions. Thereby a substantial entrainment of polymer from the bed takes place depending on particles' size and size distribution. Operation in this regime increases the risk of producing fines due to particle attrition. Powder mixing will be reduced as there is mainly conveying. Cyclone separation efficiency is also reduced and the risk of blocking solids transport line increases. On the other hand, for high values of $N_{Br}$ of greater than 7 the bed is in standard bubbling conditions and then mass and heat transfer within the bed remain insufficient. The solids mixing may be ineffective, increasing the risk of fouling and agglomeration of particles. The operation of the reactor may become less stable, leading to an increased risk of reactor shut-down.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles countercurrent to the fluidization gas. The resulting unique pressure balance leads to an intensive break up of bubbles, whereby the space-time-yield is further improved. Further as mentioned above, the wall flow velocity, i.e., the velocity of particles and gas vicinal to the inner walls is high enough to avoid the formation of lumps and sheets.

Polymer is withdrawn from the reactor. As it was discussed above, one part of the polymer may be withdrawn by using the cyclone installed in the circulation gas stream. However, the amount of polymer withdrawn therefrom is usually not sufficient for withdrawing the whole polymer production from the reactor. Therefore, it is preferred to withdraw polymer also from the reactor, especially preferably from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve whose position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

The agglomerates eventually present in the reactor may be withdrawn by using one of the powder outlets, as disclosed in EP-A-2594433. However, it is also possible and preferred to withdraw them through a separate outlet which is preferably located within the bottom zone and suitably below the base of the fluidized bed. After recovering the agglomerates may be disposed of or they may be crushed and mixed with the product.

Catalyst, which is optionally dispersed within polymer, is introduced into the reactor, suitably into the fluidized bed. Any method known in the art may be used for introducing the catalyst. According to one method the catalyst, or the polymer containing the catalyst, is introduced in a stream of inert gas. According to another method the catalyst is introduced as slurry in a liquid diluent.

It is possible to introduce the catalyst, optionally dispersed within polymer particles, also into the bottom zone to the level where the base of the bed is formed or even below it. The fluidization gas then transports the particles into the fluidized bed. This is especially useful when the gas phase reactor is preceded by a prior polymerization stage. The catalyst is then dispersed within the polymer particles formed in the prior polymerization stage.

Post-reactor Treatment

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Benefits of the Invention

The present invention can be operated for long periods of time with reduced down-time. The polymerization takes place in homogeneous conditions, i.e., in the absence of regions having different gas composition or temperature than the average of the bed. The adhesion of polymer on the wall and other parts of the reactor are avoided. Further, the circulation gas system works in a stable fashion with no indication of fouling. Thereby good product consistency and economical operation are obtained.

DESCRIPTION OF THE DRAWINGS

Figure 1:
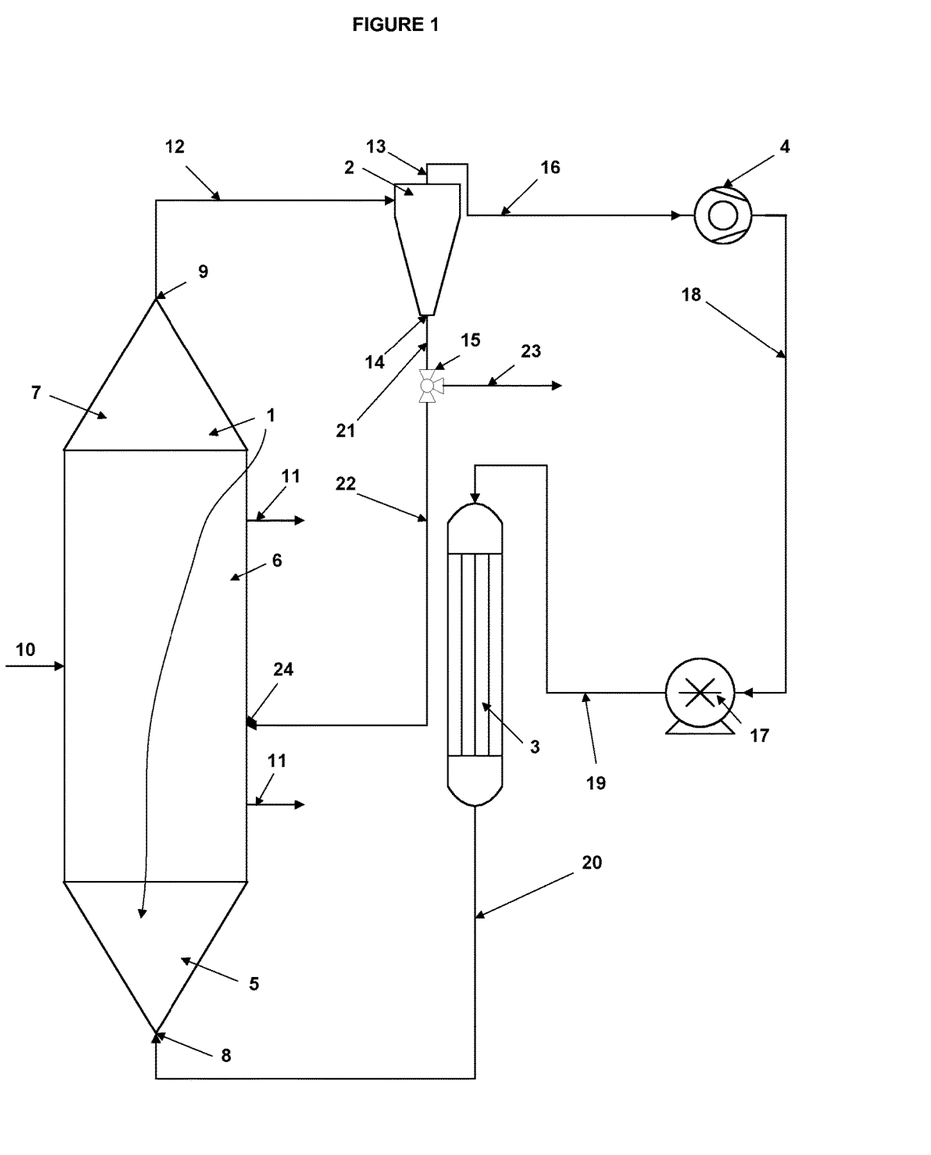
FIG. 1 is a simplified process diagram illustrating the process of the present invention.

FIG. 1 shows a reactor system according to the present invention. The reactor (1) has a bottom zone (5), a middle zone (6) and a top zone (7). The fluidization gas is introduced into the bottom zone (5) through the opening (8). While the gas flows upwards through the bottom zone (5) its superficial velocity reduces due to the increasing diameter. A fluidized bed starts to form within the bottom zone (5). The gas continues to travel upwards through the middle zone (6) where the gas velocity is constant and the bed is fully formed. Finally the gas reaches the top zone (7) from where it is withdrawn through the opening (9). The gas, together with entrained solids, passes along line (12) to a cyclone (2). The cyclone (2) removes most of the entrained solid from the circulation gas which is passed through the gas outlet (13) along the lines (16) and (18) to a compressor (17). Before the compressor (17) there is preferably a filter (4). In the compressor (17) the gas is pressurized and passed through line (19) to a cooler (3) where it is cooled. From the cooler (3) the gas is passed along the line (20) into the inlet (8) of the reactor (1).

The solid stream is passed from the cyclone (2) through the opening (14) to line (21). By using a valve (15) the solid stream may be either withdrawn and sent to further processing along line (23) or returned into the reactor (1) along line (22) through the opening (24).

The polymer is product is withdrawn from the reactor (1) along one or more outlets (11). Catalyst, optionally dispersed within polymer particles from a preceding polymerization stage, is introduced into the reactor (1) along line (10). Additional monomer, comonomer, hydrogen and inert gas may be introduced at a convenient location of the circulation gas line (16, 18, 19, 20).

Figure 2:
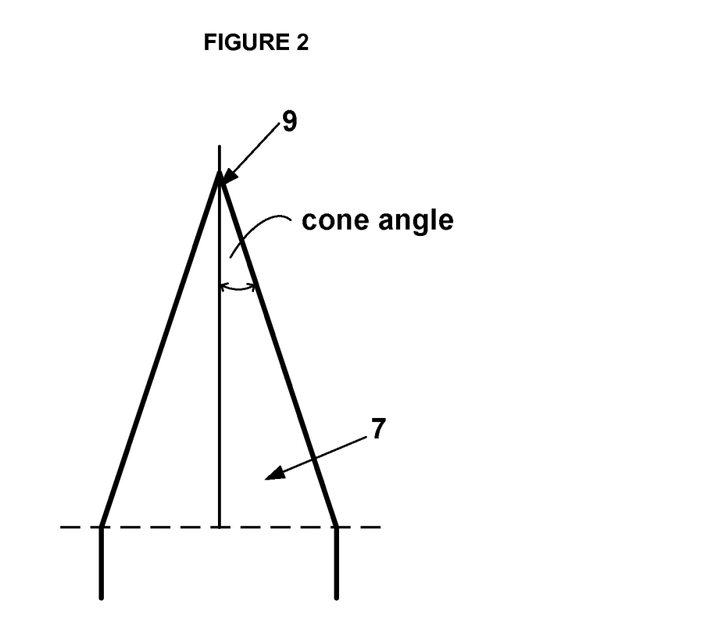
FIG. 2 is a schematic drawing illustrating the top zone of the reactor.

FIG. 2 is a schematic drawing of the top zone (7). Within the top zone, usually at its highest location, there is an opening (9) for withdrawing circulation gas from the reactor.

Figure 3:
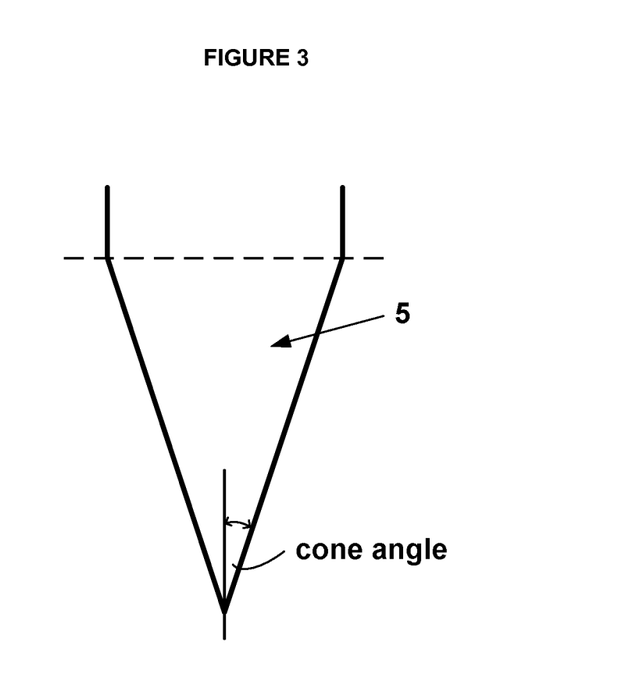
FIG. 3 is a schematic drawing illustrating the bottom zone of the present invention.

FIG. 3 shows analogously the bottom zone.

EXAMPLES

In Examples 1 to 6 the reactor was operated at an absolute pressure of 20 bars and a temperature of 85 ° C. Propane was used as the fluidization gas. The bed was formed of polyethylene particles having an average diameter ($d_{50}$) of 200 and 400 μm for HDPE and LLDPE grades respectively. HDPE had a density of 950 kg/m$^3$ and MFR$_5$ of 0.27 g/10 min; whereas, LLDPE grade had a density of 923 kg/m$^3$ and MFR$_5$ of 0.23 g/10 min. In Examples 5 and 6 the bed was formed with polypropylene particles having an average diameter ($d_{50}$) of 760 μm. PP had an MFR$_2$ of 30 g/10 min. The invention was exemplified with a reactor assembly having the following properties:

| | |
|---|---|
| Height of the bottom zone: | 900 mm |
| Height of the middle zone: | 2700 mm |
| Height of the upper zone | 415 mm |
| Diameter of the middle zone | 540 mm |

Example 1

The reactor as described above was operated so that flow rate of the fluidization gas was 570 m$^3$/h. The bed was filled with HDPE with a filling degree of about 60% of the volume of the middle zone. The superficial gas velocity at the gas inlet, where the diameter of the reactor was 100 mm, was 16 m/s and in the middle zone 0.7 m/s. It could be seen that the bubble size increased with respect to the bed height and big bubbles having a diameter of more than half of the bed diameter were present. Moreover, N$_{Br}$ was equal to 3.1 with limited solids carry over around 7% by weight (percent mass fraction of the overall mass of reactor outlet stream (stream 12)). For such case, cyclone efficiency was above 99% and the process run smoothly with no plugging in the lines.

Example 2

(Comparative)

The procedure of Example 1 was repeated with the exception that N$_{Br}$ was equal to 2.2. It was observed that there were no bubbles in the bed; moreover, there was large solids carry over around 15% by weight (percent mass fraction of the overall mass of reactor outlet stream (stream 12)). For such case, cyclone efficiency decreased below 96% and the solids circulation from cyclone downstream was interrupted.

Example 3

The reactor as described above was operated so that flow rate of the fluidization gas was 570 m³/h. The bed was filled with LLDPE with a filling degree of about 60% of the volume of the middle zone. The superficial gas velocity at the gas inlet, where the diameter of the reactor was 100 mm, was 16 m/s and in the middle zone 0.7 m/s. It could be seen that the bubble size increased with respect to the bed height and big bubbles having a diameter of more than half of the bed diameter were present. Moreover, $N_{Br}$ was equal to 3.4 with limited solids carry over around 6% by weight (percent mass fraction of the overall mass of reactor outlet stream (stream 12)). For such case, cyclone efficiency was above 99% and the process run smoothly with no plugging in the lines.

Example 4

(Comparative)

The procedure of Example 3 was repeated with the exception that $N_{Br}$ was equal to 2.3. It was observed that there were no bubbles in the bed; moreover, there was large solids carry over around 13% by weight (percent mass fraction of the overall mass of reactor outlet stream (stream 12)). For such case, cyclone efficiency decreased below 96% and the solids circulation from cyclone downstream was interrupted.

Example 5

The reactor as described above was operated so that flow rate of the fluidization gas was 570 m³/h. The bed was filled with PP as described above with a filling degree of about 60% of the volume of the middle zone. The superficial gas velocity at the gas inlet, where the diameter of the reactor was 100 mm, was 16 m/s and in the middle zone 0.7 m/s. It could be seen that the bubble size increased with respect to the bed height and big bubbles having a diameter of more than half of the bed diameter were present. Moreover, $N_{Br}$ was equal to 2.6 with limited solids carry over around 4% by weight (percent mass fraction of the overall mass of reactor outlet stream (stream 12)). For such case, cyclone efficiency was above 99% and the process run smoothly with no plugging in the lines.

Example 6

The reactor as described above was operated so that flow rate of the fluidization gas was 570 m³/h. The bed was filled with PP with a filling degree of about 60% of the volume of the middle zone. The superficial gas velocity at the gas inlet, where the diameter of the reactor was 100 mm, was 16 m/s and in the middle zone 0.7 m/s. It could be seen that the bubble size increased with respect to the bed height and big bubbles having a diameter of more than half of the bed diameter were present. Moreover, NBr was equal to 4.5 with limited solids carry over around 4% by weight (percent mass fraction of the overall mass of reactor outlet stream (stream 12)). For such case, cyclone efficiency was above 99% and the process run smoothly with no plugging in the lines.

TABLE 1

Data for Examples 1 to 6

| | 1 | 2(C) | 3 | 4(C) | 5 | 6 |
|---|---|---|---|---|---|---|
| Flow rate of fluidization gas, m³/hr | 570 | 825 | 570 | 825 | 570 | 570 |
| Bed height*, mm | 1650 | 1650 | 1650 | 1650 | 1650 | 1650 |
| Polymer powder, – | HDPE | HDPE | LLDPE | LLDPE | PP | PP |
| Filling degree of reactor**, % | 60 | 60 | 60 | 60 | 60 | 60 |
| Particles terminal velocity, m/s | 0.88 | 0.88 | 1.13 | 1.13 | 1.15 | 1.15 |
| Span, – | 2.5 | 2.5 | 2.1 | 2.1 | 1.6 | 2.1 |
| NBr, – | 3.1 | 2.2 | 3.4 | 2.3 | 2.6 | 3.5 |
| Cyclone efficiency, % | >99 | <96 | >99 | <96 | >99 | >99 |
| Reactor temperature, ° C. | 85 | 85 | 85 | 85 | 85 | 85 |
| Solids carryover, wt % | 7 | 15 | 6 | 13 | 4 | 4 |

*Starting from plane separating bottom and middle zone
**With respect to the volume of the middle zone

The invention claimed is:

1. An olefin polymerization process comprising polymerizing at least one olefin in gas phase in a fluidized bed in the presence of an olefin polymerization catalyst in a polymerization reactor having a vertical body; a generally conical downwards tapering bottom zone; a generally cylindrical middle zone having a height to diameter ratio L/D of at least 4, above and connected to said bottom zone; and a generally conical upwards tapering top zone above and connected to said middle zone wherein (i) fluidization gas is introduced to the bottom zone of the reactor from where it passes upwards through the reactor; (ii) the fluidization gas is withdrawn from the top zone of the reactor, compressed, cooled and returned into the bottom zone of the reactor; (iii) a fluidized bed is formed within the reactor where the growing polymer particles are suspended in the upwards rising gas stream; and (iv) there is no fluidization grid in the reactor; characterized in that the gas velocity is maintained in the reactor such that $N_{Br}$ is within the range of from 2.5 to 7 wherein $$N_{Br} = \frac{\frac{d_{90} - d_{10}}{d_{50}}}{\frac{U_s}{U_t}},$$

wherein $d_{90}$ represents the smallest equivalent particle diameter so that 90% of the particles have a smaller equivalent diameter than $d_{90}$; $d_{10}$ represents the smallest equivalent particle diameter so that 10% of the particles have a smaller equivalent diameter than $d_{10}$; $d_{50}$ represents the median equivalent particle diameter; $U_s$ is the superficial gas velocity within the middle zone; and $U_t$ is the terminal velocity of the particles within the reactor.

2. The process according to claim 1 wherein $N_{Br}$ is within the range of from 2.5 to 5.

3. The process according to claim 1 wherein the ratio L/D is from 4 to 15.

4. The process according to claim 3 wherein the ratio L/D is from 5 to 10.

5. The process according to claim 1 comprising the step of removing polymer from the fluidization gas which has been withdrawn from the top zone of the reactor before the compression and cooling steps.

6. The process according to claim 5 wherein the polymer removed from the fluidization gas is recovered and passed to further processing.

7. The process according to claim 5 wherein the polymer removed from the fluidization gas is returned to the polymerization reactor.

8. The process according to claim 1 wherein polymer is withdrawn from the reactor through an outlet located in the middle zone.

9. The process according to claim 8 wherein the polymer is withdrawn from the reactor continuously.

10. The process according to claim 8 wherein polymer or polymer agglomerates are withdrawn from the bottom zone of the reactor.

11. The process according to claim 1 wherein the fluidization gas is filtered before being passed to the compressor.

12. The process according to claim 1 wherein the bottom zone comprises multiple conical segments having different cone angles.

13. The process according to claim 1 further comprising the steps of (v) determining $d_{90}$, $d_{10}$ and $d_{50}$ of the polymer powder in the reactor; (vi) determining the values of $U_s$ and $U_t$ in the reactor; (vii) calculating the corresponding value of $N_{Br}$; and (viii) adjusting $U_s$ such that the value of $N_{Br}$ is within the range of from 2.5 to 7.

14. The process according to claim 13 wherein the value of $N_{Br}$ is adjusted to be within the range of from 2.5 to 5.

15. The process according to claim 13 comprising the steps of defining a set point for $N_{Br}$; calculating the actual value of $N_{Br}$ within the reactor; and adjusting $U_s$ such that the difference between said set point and said actual value comes to a minimum.

16. The process according to claim 9 wherein polymer or polymer agglomerates are withdrawn from the bottom zone of the reactor.

* * * * *